United States Patent
Yu et al.

(10) Patent No.: US 12,380,343 B2
(45) Date of Patent: Aug. 5, 2025

(54) COMPLEMENTARY EVIDENCE IDENTIFICATION IN NATURAL LANGUAGE INFERENCE

(71) Applicant: International Business Machines Corporation, Armonk, NY (US)

(72) Inventors: Mo Yu, White Plains, NY (US); Li Zhang, Yorktown Heights, NY (US); Hui Su, West Roxbury, MA (US); Shiyu Chang, Elmsford, NY (US); Ming Tan, Malden, MA (US); Xiangyang Mou, Troy, NY (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 1197 days.

(21) Appl. No.: 16/989,866

(22) Filed: Aug. 10, 2020

(65) Prior Publication Data
US 2022/0044135 A1 Feb. 10, 2022

(51) Int. Cl.
*G06N 5/04* (2023.01)
*G06F 17/18* (2006.01)
*G06F 40/20* (2020.01)
*G06N 20/00* (2019.01)

(52) U.S. Cl.
CPC .............. *G06N 5/04* (2013.01); *G06F 17/18* (2013.01); *G06F 40/20* (2020.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | |
|---|---|---|
| 8,682,647 B1 | 3/2014 | Lee |
| 9,015,031 B2 | 4/2015 | Ferrucci et al. |
| 9,842,296 B2 | 12/2017 | Clark et al. |
| 2016/0196301 A1 | 7/2016 | Solotorevsky |
| 2019/0188271 A1 | 6/2019 | Murdock et al. |

(Continued)

OTHER PUBLICATIONS

Nogueira et al, "Multi-Stage Document Ranking with BERT", 2019, arXiv:1910.14424v1, pp. 1-13. (Year: 2019).*

(Continued)

*Primary Examiner* — Alexey Shmatov
*Assistant Examiner* — Clint Mullinax
(74) *Attorney, Agent, or Firm* — Caleb Wilkes; Otterstedt & Kammer PLLC

(57) ABSTRACT

Methods and apparatus for complementary evidence identification in natural language inference. A given question is obtained and a set of N passages is obtained from a database. A probability is determined, for each passage of the set of N passages, of a corresponding passage being a supportive passage for the given question and the set of N passages is ranked based on the determined probabilities. M passages that are ranked 1 to M of the set of N passages are selected. A set of L passages is selected based on a plurality of scores, each score assigned to a set of candidate passages of the set of N passages, each score being based on the determined probabilities, the selected M passages, and a weighted regulation parameter. The set of L passages is provided to a computerized machine learning system to answer the question based on the set of L passages.

16 Claims, 8 Drawing Sheets

(56) References Cited

U.S. PATENT DOCUMENTS

| | | | |
|---|---|---|---|
| 2019/0266157 A1 | 8/2019 | Brown et al. | |
| 2019/0347297 A1 | 11/2019 | Galitsky | |
| 2021/0133224 A1* | 5/2021 | Tiwari | G06F 16/319 |

OTHER PUBLICATIONS

Truong et al, "Multimodal Review Generation for Recommender Systems", 2019, WWW '19: The World Wide Web Conference, pp. 1864-1874. (Year: 2019).*

Nogueira et al, "Passage Re-Ranking with BERT", 2020, arXiv:1901.04085v5, pp. 1-5. (Year: 2020).*

Khattab et al, "ColBERT: Efficient and Effective Passage Search via Contextualized Late Interaction over BERT", 2020, SIGIR '20: Proceedings of the 43rd International ACM SIGIR Conference on Research and Development in Information Retrieval, pp. 39-48. (Year: 2020).*

Voskarides et al, "Query Resolution for Conversational Search with Limited Supervision", 2020, SIGIR '20: Proceedings of the 43rd International ACM SIGIR Conference on Research and Development in Information Retrieval, pp. 921-930. (Year: 2020).*

Oya et al, "A Template-based abstractive meeting summarization: Leveraging summary and source text relationships", 2014, Proceedings of the 8th International Natural Language Generation Conference (INLG), pp. 45-53. (Year: 2014).*

Peter Mell and Timothy Grance, The NIST Definition of Cloud Computing, NIST Special Publication 800-145, Sep. 2011, cover, pp. i-iii and 1-3.

Luo et al., Knowledge base question answering via encoding of complex query graphs, in Proceedings of the 2018 Conference on Empirical Methods in Natural Language Processing, pp. 2185-2194. 2018.

Asai et al., Learning to retrieve reasoning paths over wikipedia graph for question answering. arXiv preprint arXiv:1911.10470, 22 pages, 2019.

Chen et al., Reading wikipedia to answer open-domain questions, arXiv preprint arXiv:1704.00051, 10 pages, 2017.

Clark et al., Simple and effective multi-paragraph reading comprehension, arXiv preprint arXiv:1710.10723, 11 pages, 2017.

Clark et al., Think you have solved question answering? try arc, the ai2 reasoning challenge, arXiv preprint arXiv:1803.05457, 10 pages, 2018.

Devlin et al., Bert: Pre-training of deep bidirectional transformers for language understanding, arXiv preprint arXiv:1810.04805, 16 pages, 2018.

Godbole et al., Multi-step Entity-centric Information Retrieval for Multi-Hop Question Answering, arXiv preprint arXiv:1909.07598, 6 pages, 2019.

Lin et al., Denoising distantly supervised open-domain question answering, in Proceedings of the 56th Annual Meeting of the Association for Computational Linguistics (vol. 1: Long Papers), pp. 1736-1745. 2018.

Min et al., Compositional questions do not necessitate multi-hop reasoning, arXiv preprint arXiv:1906.02900, 9 pages, 2019.

Min et al., Efficient and robust question answering from minimal context over documents, arXiv preprint arXiv:1805.08092, 16 pages, 2018.

Nie et al., Revealing the importance of semantic retrieval for machine reading at scale, arXiv preprint arXiv 1909.08041, 14 pages, 2019.

Peters et al., Deep contextualized word representations, in Proceedings of the 2018 Conference of the North American Chapter of the Association for Computational Linguistics: Human Language Technologies, vol. 1 (Long Papers), pp. 2227-2237.

Wang et al., Do Multi-hop Readers Dream of Reasoning Chains, arXiv preprint arXiv:1910.145207 pages, 2019.

Wang et al., R 3: Reinforced ranker-reader for open-domain question answering, in Thirty-Second AAAI Conference on Artificial Intelligence, 8 pages, 2018.

Wang et al., Evidence aggregation for answer re-ranking in open-domain question answering, arXiv preprint arXiv:1711.05116, 14 pages, 2017.

Welbl, Johannes, Pontus Stenetorp, and Sebastian Riedel. "Constructing datasets for multi-hop reading comprehension across documents." Transactions of the Association for Computational Linguistics 6 (2018): 287-302.

Williams et al., A broad-coverage challenge corpus for sentence understanding through inference, arXiv preprint arXiv:1704.05426, 11 pages, 2017.

Yang et al., Hotpotqa: A dataset for diverse, explainable multi-hop question answering. arXiv preprint arXiv:1809.09600, 12 pages, 2018.

Yao et al., Docred: A large-scale document-level relation extraction dataset, arXiv preprint arXiv:1906.06127, 14 pages, 2019.

* cited by examiner

⟵ 400

Data: Vector representation of quesion (q), vector representation of all the N passages $\{p_n\}$ ($\{p_n\}$); the maximum number of passage to select (L); the beam size (M); a vector of weights for all regularization terms $\lambda$.
Result: The top ranked complementary passages.
/* Predict the probability $P(p_i)$ of being a supporting passage for each passage $p_i$ given q  */
1 for $i \in [1,N]$ do
2    | $P(p_i) \leftarrow f(q, p_i)$;
3 end
4 Rank the passages by $P(p_i)$;
5 $P_{span} = []$
6 Pick M passages with top $P(p_i)$ into $P_{span}$;
7 for depth $\in [2,L]$ do
8    | $P'_{span} = []$;
9    | for $j \in [1,M]$ do
          /* $P_j$ is a selected subset, $s_j$ is the corresponding score  */
10       | Pop the j-th tuple $(P_j, s_j)$ from $P_{span}$;
11       | for $n \in [1,N]$ do
12          | if The set $P_j \cup \{p_n\}$ is covered by $P'_{span}$ then
13             | continue
14          | end
            /* $r_n$ is the regulation increases by adding $p_n$ to $P_j$  */
15          | Put $(P_j \cup \{p_n\}, s_j + P(p_n) + \lambda r_n)$ into $P'_{span}$;
16          | if M tuples added based on $P_j$ then
17             | break
18          | end
19       | end
20    | end
21    | Rank $P'_{span}$ according to the scores;
22    | $P_{span} \leftarrow P'_{span}[1:M]$
23 end
24 Return $P_{span}[0]$

FIG. 4

Question: The Worst Journey in the World is a memoir written by which English explorer of Antarctica?
Answer: Apsley George Benet Cherry-Garrard Baseline
- P1: The Worst Journey in the World is a memoir of ... It was written and published in 1922 by a member of the expedition, Apsley Cherry-Garrard, and ...

Disclosed Method
- P1: The Worst Journey in the World is a memoir of ... It was written and published in 1922 by a member of the expedition, Apsley Cherry-Garrard, and ...

Supp Passage: {P1, P3}
- P2: The Worst Journey in the World is a 2007 BBC Television docudrama based on the memoir of the same name by polar explorer Apsley Cherry-Garrard ...
- P3: Apsley George Benet Cherry-Garrard was an English explorer of Antarctica. He ... is acclaimed for his ... "The Worst Journey in the World".

Question: Robert Suettinger was the national intelligence officer under which former Governor of Arkansas?
Answer: William Jefferson Clinton Baseline
- P1: Homer Martin Adkins (October 15, 1890– February 26, 1964) was the 32nd governor of the U.S. state of Arkansas. Prior to his public service as ...

Disclosed Method
- P1: Homer Martin Adkins (October 15, 1890– February 26, 1964) was the 32nd governor of the U.S. State of Arkansas. Prior to his public service as ...

Supp Passage: {P3}
- P2: William Asa Hutchinson II (born December 3, 1950) is an ... politician who has been the 46th Governor of Arkansas since 2015. Previously ...
- P3: Robert Suettinger was United States President Clinton's national intelligence officer for ... from 1997-1998. While there, Suettinger ...

FIG. 5

COMPLEMENTARY EVIDENCE IDENTIFICATION IN NATURAL LANGUAGE INFERENCE

BACKGROUND

The present invention relates to the electrical, electronic and computer arts, and more specifically, to natural language processing (NLP).

In recent years, significant progress has been made in the field of open-domain question answering. Very recently, the more challenging task of asking complex questions from the open-domain text corpus has been researched. In the open-domain scenario, one pertinent challenge raised by complex questions is that each question may require multiple pieces of evidence to get the right answer, where the evidence may be scattered in different passages. How to efficiently retrieve a small number of paragraphs that cover the full evidence thus becomes an important problem. Previous solutions rely on traditional information retrieval (IR) or neural IR approaches, which measure the relevance between the question and each paragraph independently, and thus are not well-suited to the problem of finding full evidence for a question.

SUMMARY

Principles of the invention provide techniques and systems for complementary evidence identification in natural language inference. In one aspect, an exemplary method for natural language inference includes the operations of obtaining a given question for input to a hardware processor; obtaining, using the hardware processor, a set of N passages from an electronic database; determining, using the hardware processor, for each passage of the set of N passages, a probability of a corresponding passage being a supportive passage for the given question; ranking, using the hardware processor, the set of N passages based on the determined probabilities; selecting, using the hardware processor, M passages that are ranked 1 to M of the set of N passages; selecting, using the hardware processor, a set of L passages based on a plurality of scores, each score assigned to a set of candidate passages of the set of N passages, each score being based on the determined probabilities, the selected M passages, and a weighted regulation parameter; and providing, using the hardware processor, a set of M highest ranked passages of the set of L passages to a computerized machine learning system to answer the question based on the set of L passages.

In one aspect, a non-transitory computer readable medium comprises computer executable instructions which when executed by a computer cause the computer to perform the method of obtaining a given question; obtaining a set of N passages from an electronic database; determining for each passage of the set of N passages, a probability of a corresponding passage being a supportive passage for the given question; ranking the set of N passages based on the determined probabilities; selecting M passages that are ranked 1 to M of the set of N passages; selecting a set of L passages based on a plurality of scores, each score assigned to a set of candidate passages of the set of N passages, each score being based on the determined probabilities, the selected M passages, and a weighted regulation parameter; and providing a set of M highest ranked passages of the set of L passages to a computerized machine learning system in order to answer the question based on the set of L passages.

In one aspect, an apparatus comprises a memory; and at least one processor, coupled to said memory, and operative to perform operations comprising obtaining a given question; obtaining a set of N passages from an electronic database; determining for each passage of the set of N passages, a probability of a corresponding passage being a supportive passage for the given question; ranking the set of N passages based on the determined probabilities; selecting M passages that are ranked 1 to M of the set of N passages; selecting a set of L passages based on a plurality of scores, each score assigned to a set of candidate passages of the set of N passages, each score being based on the determined probabilities, the selected M passages, and a weighted regulation parameter; and providing a set of M highest ranked passages of the set of L passages to a computerized machine learning system in order to answer the question based on the set of L passages.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

inference speed: a disclosed beam search technique with score function generates minor overhead in the running time (on the order of 0.1% for the disclosed vector-based complementary selection approach in comparison to conventional approaches);

formulation of a new problem of complementary evidence identification, definition of formal conditions that a set of complementary evidence should satisfy, and design of a vector-space-based approach that supports efficient training and inference for complementary evidence selection;

an efficient method for selecting a set of spanning bases (for a query) that are sufficient, diverse and compact;

20% improvement compared to neural network models having the same architecture in terms of coverage of the results, with only negligible overhead in running time;

techniques that scale well to computationally complex cases;

more accurate results compared to systems that utilize conventional techniques;

enhanced performance of computerized machine learning systems, such as neural networks, that utilize the results generated by the disclosed techniques; and techniques that are demonstrated to consistently match or outperform state-of-the-art baselines from conventional inference systems;

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 is an example algorithm for Complementary Evidence Selection via Beam Search, in accordance with an example embodiment;

FIG. 5 is a set of examples illustrating how the disclosed model improves over the baseline, in accordance with an example embodiment.

DETAILED DESCRIPTION

Figure 1:
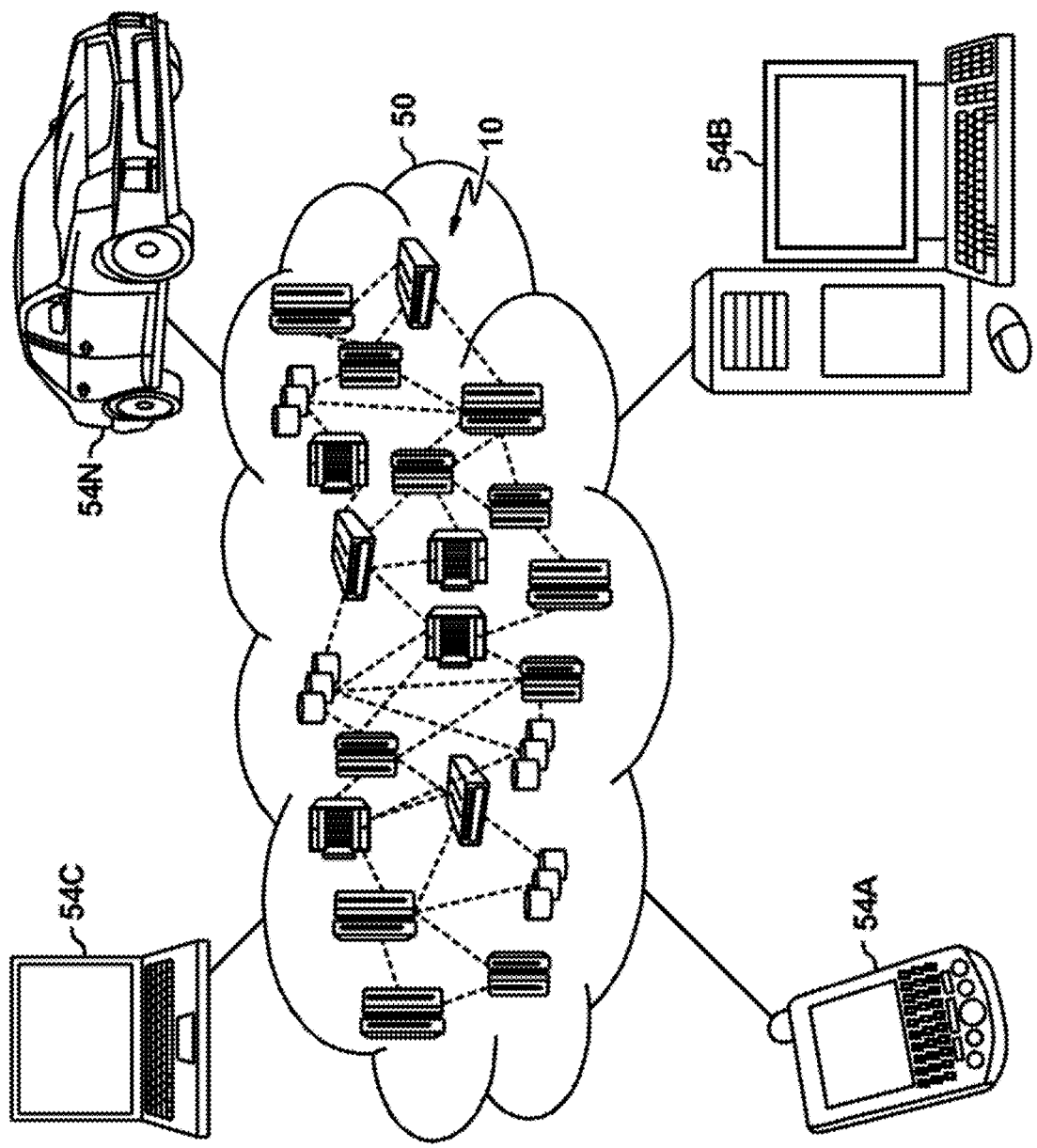
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
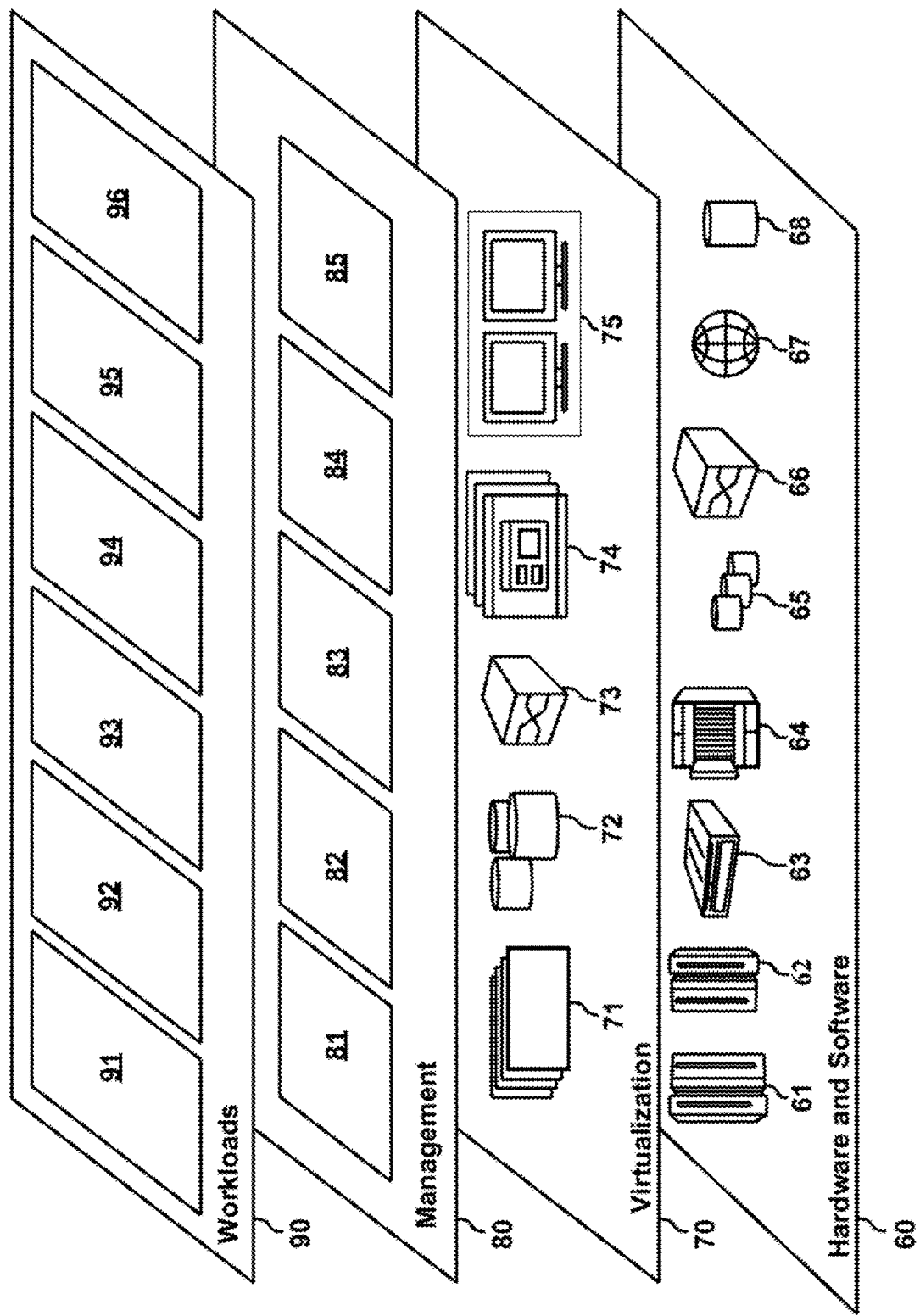
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 for natural language inference processing, it being understood that cloud, non-cloud, and combined approaches could be employed.

Generally, methods and systems for performing natural language inference are disclosed. In one example embodiment, a problem of complementary evidence identification for open-domain question answering is defined. The problem aims to efficiently find a small set of passages that covers full evidence for answering a complex question that depends on multiple facts. To this end, in addition to the relevance between a question and passages, the sufficiency and diversity of the selected set is defined. A method is further described that learns vector representations of passages and models the above criterion. Experiments on the multi-hop question/answer (QA) dataset HotpotQA demonstrate that the disclosed methods consider the dependence within the supporting evidence and significantly improve the accuracy of complementary evidence selection.

Answering Complex Questions from the Open-Domain Text Corpus

A complex question may require multiple pieces of evidence scattered in different passages. For example, consider the question: which physicist, mathematician and astronomer discovered the first four moons of Jupiter? In the open-domain scenario, one pertinent challenge raised by complex questions is that each question may require multiple pieces of evidence to get the right answer, where the evidence is scattered in different passages. Based on the following excerpts, both Isaac Newton and Galileo Galilei may be hypothesized as the correct answer:

P1: Sir Isaac Newton was an English physicist, mathematician, astronomer, natural philosopher, alchemist and theologian . . .

P2: Sir Isaac Newton was an English mathematician, astronomer, and physicist who is widely recognized as one of the most influential scientists . . .

P3: Galileo Galilei was an Italian physicist, mathematician, astronomer, and philosopher who played a major role in the Scientific Revolution.

P4: Galileo Galilei is credited with discovering the first four moons of Jupiter.

To deal with challenging multi-evidence questions, an open-domain QA system should be able to (1) efficiently retrieve a small number of passages that cover the full evidence; and (2) accurately extract the answer by considering the joint set of potential evidence passages. While there have been several prior works in the latter direction, the solutions to the first problem still rely on traditional information retrieval (IR) or neural IR approaches, which measure the relevance between the question and each passage independently, and thus are not well-suited to the multi-evidence QA problem. In the above example, an incorrect answer "Newton" has two evidence passages (P1 and P2) that are closely related to the question but only cover the same single fact required by the question, while the correct answer "Galilei" has a combination of evidence passages (P3 and P4) covering the full facts for the question.

Therefore, ranking passages solely by relevancy will quite possibly bring the wrong evidence to the top.

Complementary Aggregation for Multi-Hop QA

Consider the question: what was the father of Kasper Schmeichel voted to be by the International Federation of Football History and Statistics (IFFHS) in 1992? Based on the following excerpts, World's Best Goalkeeper may be hypothesized as the correct answer:

Kasper Peter Schmeichel (born 5 Nov. 1986) is a Danish professional footballer who plays as a goalkeeper for Premier League club Leicester City and the Denmark national team. He is the son of former Manchester United and Danish international goalkeeper Peter Schmeichel.

Peter Boleslaw Schmeichel (born 18 Nov. 1963) is a Danish former professional footballer who played as a goalkeeper, and was voted the IFFHS World's Best Goalkeeper in 1992 and 1993.

In one example embodiment, a new problem of complementary evidence identification for answering complex questions is formulated. One aspect is to consider the problem as measuring the properties of the selected passages, more than the individual relevance. Specifically, the selected passages are proposed to serve as a set of spanning bases that supports the question. The selected passage set thus should satisfy the properties of (1) coverage, i.e., the passages should be able to cover all the facts asked by the question; (2) diversity, i.e., the passages should cover diverse information given that the coverage property is satisfied; and (3) compactness, i.e., the number of passages to satisfy the above properties should be minimal. With these three defined properties, the goal is to both improve the selective accuracy and encourage the explainability of the evidence identification. To achieve the above goals, a straightforward approach is to train a model that evaluates each subset of the candidate passages, e.g., by concatenating passages in any subsets. However, this approach is highly inefficient since it requires encoding $O(K^L)$ passage subsets, where K is the total number of candidates and L is the maximum size of subsets. Thus, a practical complementary evidence identification method needs to be computationally efficient. This aspect is quite pertinent when heavy models are used, where passage encoding is time and memory consuming.

To this end, given a question/query q, an efficient method is disclosed to select a set of spanning passages (a subset of passages $P_{span} \subset P$ carrying comprehensive information related to q) from, for example, an information retrieval system that is sufficient and diverse. A pertinent aspect is to represent questions and passages in a vector space and define the measures of the criterion in the vector space. For example, in the vector space, sufficiency can be defined as a similarity between the question vector and the summation of selected passage vectors, measured by a cosine function; and diversity can be defined as an $\ell_1$ distance between each pair of passages. By properly training the passage encoder with a loss function derived by the above terms, the resulting vector space is expected to satisfy the property that the complementary evidence passages lead to small losses. In addition, the method only encodes each passage in the candidate set once, which is more efficient than the naive solution mentioned above. To evaluate the proposed method, the multihop QA dataset HotpotQA (the full wiki setting) is used since the ground-truth of evidence passages are provided. Experiments show that the disclosed method significantly improves the accuracy of complementary evidence selection and the overall result provided by the open-domain QA system which utilizes the selected passages. The open-domain QA system can be, for example, a neural network and can be implemented on the same or different processor as the passage selection operations of the example algorithm for Complementary Evidence Selection via Beam Search of FIG. 4.

Exemplary Method

Task Definition

Given a question q and a mixture set of passages $P=P^+ \cup P^-$ with some passages $p \in P^+$ relevant to q and some $p \in P^-$ irrelevant, the goal is to select a small subset of passages $P_{sel} \subset P$, such that every $P \in P_{sel}$ satisfies $p \in P^+$ (relevancy), and all $p \in P_{sel}$ can jointly cover all the information asked by q (complementary). The off-the-shelf models select relevant passages independently, and thus usually cannot deal with the complementary property. The inner dependency among the selected $P_{sel}$ should be considered, which will be modeled as set forth herein.

Model and Training

Vector Space Modeling

Figure 3A:
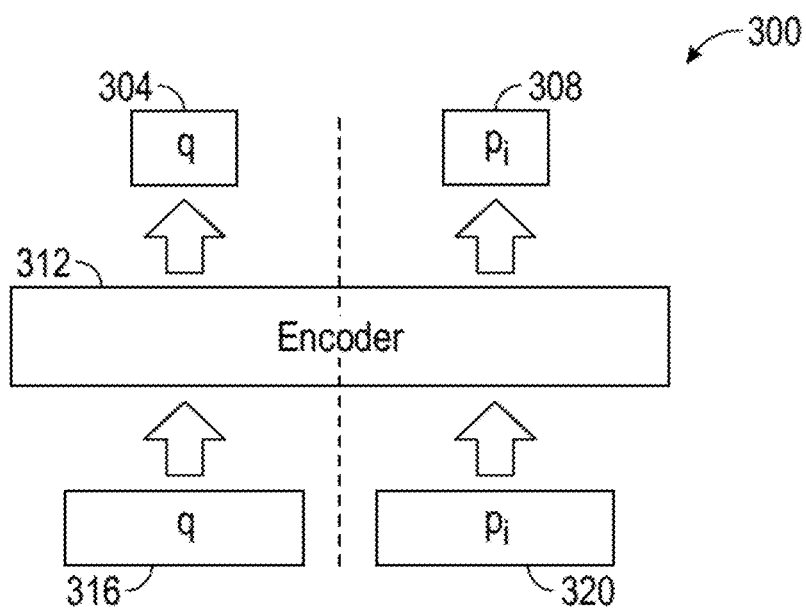
FIGS. 3A and 3B illustrate two example encoders for encoding a question and a passage into vectors, in accordance with an example embodiment.
Figure 3B:
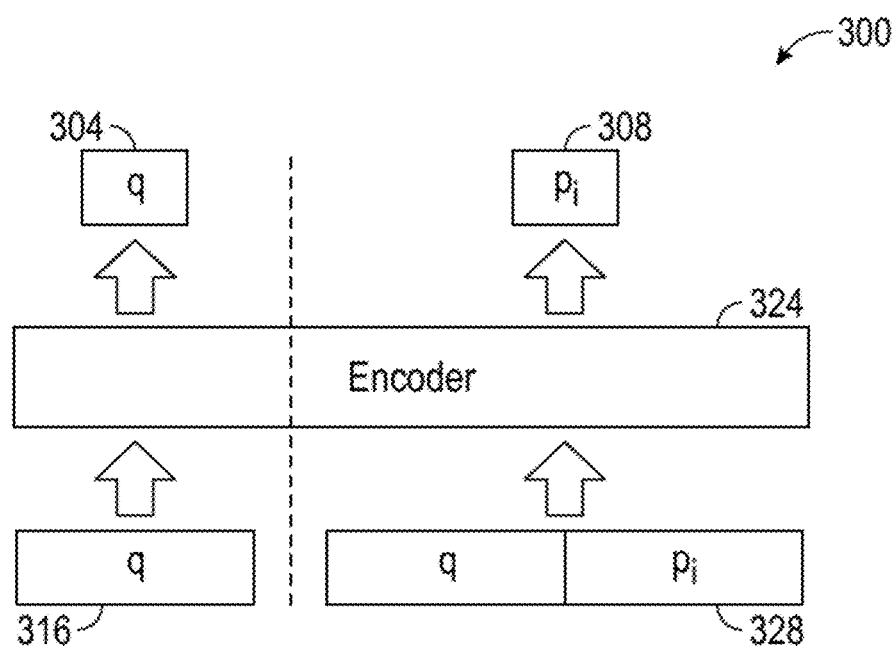

The Bidirectional Encoder Representations from Transformers (BERT) model is applied to estimate the likelihood of a passage p being the supporting evidence to the question q, denoted as P(p|q). (It is noted that BERT is a non-limiting example of a transformer and a transformer is a non-limiting example of an encoder.) Let q and $p_i$ denote the input texts of a question and a passage. FIGS. 3A and 3B illustrate two example encoders 312, 324 for encoding a question q 316 and a passage $p_i$ 320 into vectors, in accordance with example embodiments. (It is noted that BERT is a non-limiting example of a transformer and a transformer is a non-limiting example of an encoder.) In the example embodiment of FIG. 3A, an encoder 312 encodes the question q 316 into a first vector representation q 304 and encodes the passage $p_i$ 320 into a second vector representation $p_i$ 308. The encoder 312 may be implemented with a convolutional neural network (CNN), a long short-term memory (LSTM), a transformer, and the like.

In the example embodiment of FIG. 3B, the question q 316 and the concatenation 328 of q 316 and $p_i$ 320 are fed into the encoder 324, and the hidden states of the last layer are used to represent q 316 and $p_i$ 320 in vector space, denoted as q 304 and $p_i$ 308, respectively. A fully connected layer f(•) followed by sigmoid activation is added to the end of the BERT model; this outputs a scalar P ($p_i$|q) to estimate how relevant the passage $p_i$ 320 is to the question. Note that $p_i$ 308 is based on both q 316 and $p_i$ 320, but the condition on q 316 is omitted for simplicity. The encoder 324 may be implemented with a transformer and the like.

Complementary Conditions

Conventional techniques extract evidence passages according to P(p|q), which is estimated on each passage separately without considering the dependency among selected passages. To extract complementary evidence, the selected passages $P_{sel}$ should satisfy the following conditions that intuitively encourage each selected passage to be a basis to support the question:

Relevancy: the selected passages should be similar to the query; $P_{sel}$ should have a high probability of $\Sigma_{p_i \in P_{sel}} P(p_i|g)$ such as a probability that is higher than an average probability for an unselected set of passages (for example, the probability that the passages of $P_{sel}$ are relevant to the query q is greater than the probability that an average passage that was not selected from a candidate set of passages is relevant to the query q);

Coverage: $P_{sel}$ should be able to cover all the facts asked by the question, i.e., the joint set of passages in $P_{sel}$ should have high similarity to q. For example, maximizing cos $(\Sigma_{i \in \{i|p_i \in P_{sel}\}} p_i, q)$;

Diversity: $P_{sel}$ should cover passages as diverse as possible, which can be measured by the average distance between any pairs in $P_{sel}$ e.g., maximizing $\Sigma_{i,j \in \{i,j|p_i, p_j \in P_{sel}, i \neq j\}} \ell_1(p_i, p_j)$. Here, $\ell_1(\cdot, \cdot)$ denotes $L_1$ distance;

Compactness: finally, $P_{sel}$ should optimize the aforementioned conditions while keeping the size to a minimum. In one example embodiment, the compactness is constrained by fixing the maximum size of $P_{sel}$ during inference.

Training with Complementary Regularization

Figure 3C:
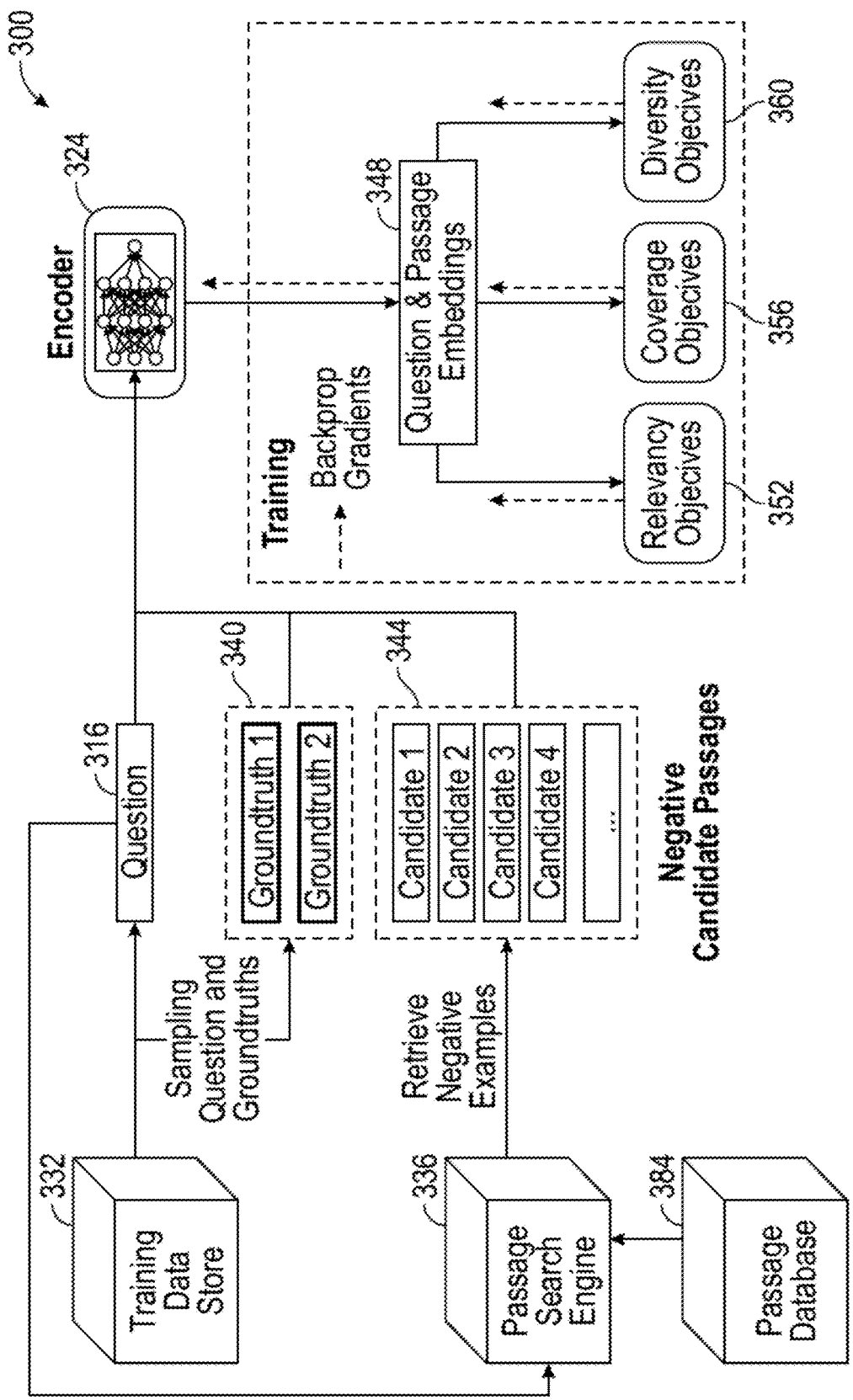
FIG. 3C illustrates a training workflow for an encoder, such as a neural encoder, of an example system, in accordance with an example embodiment.

A new supervised training objective is used to learn the BERT encoder for QA that optimizes the previous conditions. FIG. 3C illustrates a training workflow for an encoder 324, such as a neural encoder, of an example system 300, in accordance with an example embodiment. A set of labeled training examples in a training data store 332 is assumed to be available, e.g., ground truth annotations 340 containing complementary supporting passages. Recently, there has been growth in such datasets due to the increasing interest in model explainability. Furthermore, such supervision signals can also be obtained with distant supervision.

In the example embodiment of FIG. 3C, negative candidate examples 344 are retrieved by a passage search engine 336 from a passage database 384 that contains, for example, the negative candidate examples 344 and the candidate passages 376. The skilled artisan will appreciate that additional datastores can be provided as appropriate. Negative candidate examples 344 are candidate passages that appear similar to the question q 316, but are not members of the candidate passages 376. The ground truth annotations 340 and the negative candidate examples 344 are used by the encoder 324 during training. As described below, question and passage embeddings 348 (such as q 304 and $p_i$ 308) are generated by the encoder 324 for a question q 316 based on relevancy objectives 352, coverage objectives 356, and diversity objectives 360. Given the teachings herein, the skilled artisan will be able to use back propagation to train a neural network to implement one or more embodiments to meet the objectives. For each training instance (q, P), $\{p_i\}^+ = \{p_i\}, \forall_i \in \{i|p_i \in P^+\}$; $\{p_i\}^- = \{p_i\}, \forall_i \in \{i|p_i \in P^-\}$; and $\{p_i\} = \{p_i\}^+ \cup \{p_i\}^-$ is defined. Denoting $y_{p_i} = 1$, the following training objective function is defined:

$$\mathcal{L}(\{p_i\}; q; y) = \mathcal{L}_{sup}(\{p_i\}; q; y) + \alpha \mathcal{L}_c(\{p_i\}; q; y) + \beta \mathcal{L}_d(\{p_i\}^+)$$

where $$\mathcal{L}_{sup}(\{p_i\}; q; y) = -\sum_i y_{p_i} \log(f(p_i)), \quad (1)$$

$$\mathcal{L}_c(\{p_i\}; q; y) = \begin{cases} 1 - \cos(q, \sum_i p_i), & \\ \quad \text{if } \prod_{p_i} y_{p_i} = 1 & (2) \\ \max(0, \cos(q, \sum_i p_i) - \gamma), & \\ \quad \text{if } \prod_{p_i} y_{p_i} = 0 & \end{cases}$$

$$\mathcal{L}_d(\{p_i\}^+) = \sum_{p_i, p_j, i \neq j} (1 - \ell_1(p_i, p_j)). \quad (3)$$

where $\alpha$ and $\beta$ are the hyperparameter weights and $\ell_1(\cdot, \cdot)$ denotes an $L_1$ loss between two input vectors. Eq. 1 is the cross-entropy loss corresponding to the relevance condition (a measure of the similarity, a measure of the dissimilarity, or both between the question vector and each passage vector, such as a high measure of similarity or a low measure of dissimilarity); Eq. 2 is the cosine-embedding loss for the coverage condition and $\gamma$ is the cosine similarity margin (a measure of the similarity between the question vector and the subspace spanned by the selected passage vectors); and Eq. 3 regularizes the diversity condition (a measure of the overall distance among supporting passage vectors). The cosine similarity margin is optional and can be omitted in some circumstances (i.e. $\gamma=0$); if used, the cosine similarity margin can be obtained heuristically. If the cosine similarity measure is lower than the cosine similarity margin, then the Bert model, for example, is punished; if the cosine similarity measure is equal to or higher than the cosine similarity margin, then no action is needed.

Inference Via Beam Search

Score Function

Figure 3D:
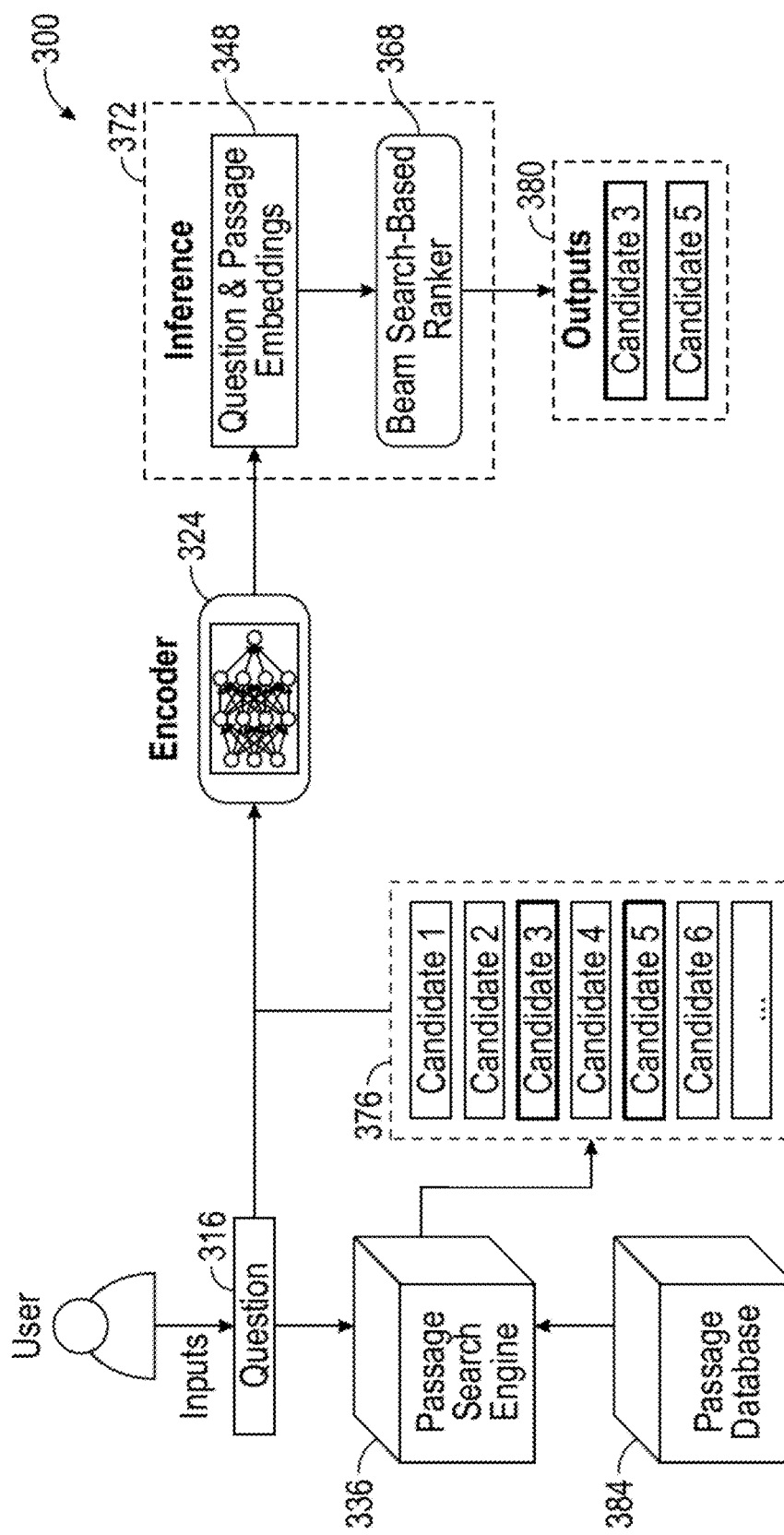
FIG. 3D illustrates an inference workflow for the neural encoder of the example system, in accordance with an example embodiment

FIG. 3D illustrates an inference workflow for the neural encoder 324 of the example system 300, in accordance with an example embodiment. During inference, one goal is to identify the subset of passages that jointly provide the best score to meet a complementary objective for a question q 316. In the example embodiment of FIG. 3D, a subset of question and passage embeddings 348 (such as q 304 and $p_i$ 308) are generated by the encoder 324 and a score function, such as defined by equation (4) below, is used by a beam search-based ranker 368 of an inference engine 372 to find the best passages (outputs 380) of a set of candidate passages 376, as described below in conjunction with the algorithm of FIG. 4:

$$g(P_{sel}; q; \{p_i\}) = \Sigma_{p_i} Pr(p_i|q) + \alpha \cos(\Sigma_{p_i} p_i, q) + \beta \Sigma_{p_i, p_j, i \neq j} \ell_1(p_i, p_j) \quad (4)$$

(where $\alpha$ and $\beta$ are hyperparameters similar to Eq (1)). Note that the disclosed approach only requires encoding each passage in P, and the subset selection is performed only in the vector space which is much more efficient (O(K) time complexity of encoding, K=|P|). In a non-limiting example, the values of $\alpha$ and $\beta$ are 0.5 and 1.0, respectively. Additional values for the hyperparameters defined herein, such as $\alpha$ and $\beta$, may be determined using a grid search. The skilled artisan will appreciate that the values of the hyperparameters depend on the particular application, and, given the teachings herein, will be able to use appropriate heuristics to select appropriate values of $\alpha$ and $\beta$ for different applications.

Complementary Evidence Selection Via Beam Search

FIG. 4 is an example algorithm 400 for Complementary Evidence Selection via Beam Search, in accordance with an example embodiment. The method 400 is based on a discrepancy measure to measure the difference between question and passages and select the best subset (setting a threshold over the coverage term). For efficient inference when L=2, the selection of the top-N (N<<K) most relevant passages is initiated. The combinations between each passage pair in the top-N set and another top-M set are scored. This reduces the complexity from $O(K^2)$ to $O(M*N)$. M is a hyperparameter corresponding to the beam size. In a more general setting with L≥2, the algorithm has a complexity of $O((L-1)M*N)$ instead of $O(K^L)$, which is shown in algorithm 400.

In the example algorithm 400 of FIG. 4, a given question q is obtained and a set of N passages are obtained from a database, such as the passage database 384 (the skilled artisan will appreciate that additional data stores can be provided as appropriate). For each passage $p_i$ of the set of N passages, a probability $P(p_i)$ of a corresponding passage $p_i$ being a supportive passage for the given question q is determined (lines 1-3 of the algorithm 400).

The set of N passages are ranked based on the determined probabilities $P(p_i)$ (line 4 of the algorithm 400). A set of passages $P_{span}$ is initialized to a null set (line 5 of the algorithm 400) and the set of passages $P_{span}$ is updated with the M passages of the set of N passages that are ranked 1 to M (line 6 of the algorithm 400).

For each of the passages $p_2$ to $p_L$ (lines 7 and 23 of the algorithm 400) where L is the count of passages to be selected:

$P'_{span}$ is initialized to a null set (line 8 of the algorithm 400);

For each of the M tuples (each tuple including a probability $P(p_j)$ and a corresponding score ($s_j$)) from $P_{span}$ (lines 9 and 20 of the algorithm 400):

Pop the j-th tuple from $P_{span}$ (line 10 of the algorithm 400);

For each of the N passages (lines 11 and 19 of the algorithm 400):

Put $(P_j \cup \{p_n\}, s_j+P(p_n)+\lambda r_n)$ into $P'_{span}$ if the set $P_j \cup \{p_n\}$ was not already covered by $P'_{span}$, continuing until M tuples have been added to $P'_{span}$ based on $P_j$ (lines 12-18 of the algorithm 400);

rank $P'_{span}$ according to the scores (line 21 of the algorithm 400);

set $P_{span}$ to $P'_{span}[1: M]$ (line 22 of the algorithm 400);

return the set of M passages, $P_{span}$ [0], that are the highest ranked subset of passages (line 24 of the algorithm 400).

In a real-world application, there is usually a large candidate set of P, e.g., retrieved passages for q via a traditional IR system. The algorithm requires O(K) time encoding, and $O(K^L)$ time scoring in vector space when ranking all the combinations in L candidates. Thus, when K becomes large, it is still inefficient even when L=2. Beam search is used to deal with scenarios with large Ks.

Experiments

Settings

Datasets

The disclosed approach was evaluated on two datasets, a synthetic Multi-Genre Natural Language Inference dataset MNLI-12 and a real application HotpotQA-50. MNLI-12 is constructed based on the textual entailment dataset MNLI, in order to verify the ability of the method in finding complementary evidence. In original MNLI, each premise sentence corresponds to one entailment, one neutral, and one contradiction hypothesis sentence. The premise is taken as q, and each of its corresponding hypotheses is split into two segments with a random split point near the middle of the sentence. This results in a total of 6 segments. Combining these with the 6 segments corresponding to another premise, the result is P with 12 segments for each q, among which the 2 segments from the original entailment sentence are annotated as $P^+$. The goal is to find the segment combination that entails q, and the dataset, by definition, ensures that only the combination of $P^+$ can entail q, not any of its subset or other combinations. The original train/development/test splits from MNLI are used.

HotpotQA-50 is based on the open-domain setting of the multi-hop QA benchmark HotpotQA. The original task requires finding evidence passages from abstract passages of all Wikipedia pages to support a multi-hop question. For each q, 50 relevant passages are collected based on bigram BM25. Two positive evidence passages to each question are provided by human annotators as the ground truth. Note that there is no guarantee that P covers both evidence passages here. The original development set from HotpotQA is used as the test set and a subset is randomly split from the original training set as the production development set.

Baseline

The results are compared with the BERT passage ranker that is commonly used on open-domain QA including HotpotQA. The baseline uses the same BERT architecture as the approach described elsewhere herein, but is trained with only the relevancy loss (Eq. 1).

Metric

During the evaluation, each method outputs its top 2 ranked results (i.e., the top 1 ranked pair from the disclosed method) as the prediction. The final performance is evaluated by exact match (EM), i.e., whether both true evidence passages are covered, and by the F1 score on the test sets.

Results

In the experiments, M=3, N=4 for MNLI-12 and M=4, N=5 for HotpotQA-50. The values are selected according to development performance. Table 1 shows the performance. The disclosed method achieves significant improvements on both datasets.

TABLE 1

| | Model Evaluation (%) | | | |
|---|---|---|---|---|
| | HotpotQA-50 | | MNLI-12 | |
| System | EM | F1 | EM | F1 |
| BERT Baseline | 16.67 | 41.29 | 41.61 | 67.57 |
| Our Method | 20.15 | 49.10 | 53.81 | 73.18 |
| Upper-Bound | 35.49 | 61.08 | 100.00 | 100.00 |

On HotpotQA-50, both systems have low EM scores because of the relatively low recall of the BM25 retrieval. Only 35.49% of the samples in the test set contain both ground-truth evidence passages. On MNLI-12, the EM score is around 50%. This is mainly because the segments are usually much shorter than a passage, with an average length of 7 words. Therefore, it is more challenging in matching the q with the $p_i$s.

FIG. 5 is a set of examples 500 illustrating how the disclosed model improves over the baseline, in accordance with an example embodiment. In both examples, the baseline model selected the top-2 most relevant passages (P1, P2) to the question regardless of their complementation; whereas the disclosed model made the selection (P1, P3) with consideration of both relevance and evidence sufficiency. Note that, in the bottom example, one of the ground-truth supporting passages and the answer were excluded when building the dataset.

The disclosed method can successfully select complementary passages while the baseline only selects passages that look similar to the question. A more interesting example is given at the bottom where the top-50 only covers one supporting passage. The baseline selects two incorrect passages that cover essentially identical facts required by the question (identity of governor of Arkansas), while the inventive method gives a lower score to the second passage (about William Asa Hutchinson II) since that passage does not provide new information, and instead reaches a supporting selection containing the required information. A similar situation contributes to the majority of improvement on one-supporting-evidence data sample in HotpotQA-50.

Inference Speed

The disclosed beam search technique with score function brings slight overheads to the running time. On HotpotQA-50, it takes 1,990 milliseconds (ms) on average to obtain the embeddings of all passages for one data sample whereas the disclosed vector-based complementary selection only adds an extra 2 ms which can be negligible compared to the encoding time.

Given the discussion thus far, it will be appreciated that, in general terms, an exemplary method for natural language inference includes the operations of obtaining a given question q 316 for input to a hardware processor; obtaining, using the hardware processor, a set of N passages from an electronic passage database 384; determining, using the hardware processor, for each passage $p_i$ 320 of the set of N passages, a probability of a corresponding passage $p_i$ 320 being a supportive passage for the given question q 316 (lines 1-3 of algorithm 400); ranking, using the hardware processor, the set of N passages based on the determined probabilities (line 4 of algorithm 400); selecting, using the hardware processor, M passages that are ranked 1 to M of the set of N passages (line 6 of algorithm 400); selecting, using the hardware processor, a set of L passages $P_{sel}$ based on a plurality of scores (lines 7 and 23 of algorithm 400), each score assigned to a set of candidate passages of the set of N passages, each score being based on the determined probabilities, the selected M passages, and a weighted regulation parameter; and providing, using the hardware processor, a set of M highest ranked passages of the set of L passages $P_{sel}$ to a computerized machine learning system to answer the question q 316 based on the set of L passages $P_{sel}$ (line 24 of algorithm 400).

In one example embodiment, the set of N passages comprises a mixture set of passages $P=P^+ \cup P^-$ with one or more passages $p \in P^+$ being relevant to the given question q 316 and one or more passages $p \in P^-$ being irrelevant to the given question q 316.

In one example embodiment, a score function g for finding a best passage is defined by:

$$g(P_{sel}; q; \{p_i\}) = \Sigma_{p_i} Pr(p_i|q) + \alpha \cos(\Sigma_{p_i} p_i, q) + \beta \Sigma_{p_i, p_j, i \neq j} \ell_1(p_i, p_j)$$

where α and β are hyperparameters, and $\ell(\cdot, \cdot)$ denotes an $L_1$ loss between two input vectors.

In one example embodiment, the selected set of L passages $P_{sel}$ is similar to the given question q 316 such that $P_{sel}$ has a probability of $\Sigma_{p_i \in P_{sel}} Pr(p_i|q)$ that is higher than an average probability for an unselected set of passages; $P_{sel}$ covers all facts asked by the given question q 316 such that a joint set of passages in $P_{sel}$ has a high similarity to the given question q 316 and maximizes $\cos(\Sigma_{i \in \{i|p_i \in P_{sel}\}} p_i, q)$; and $P_{sel}$ covers passages $p_i$ having diversity based on an average distance between any pair of passages $p_i$ in $P_{sel}$.

In one example embodiment, the diversity is attained by maximizing $\Sigma_{i,j \in \{i,j|p_i,p_j \in P_{sel}, i \neq j\}} \ell(p_i, p_j)$ where $\ell(\cdot, \cdot)$ denotes an $L_1$ distance; and wherein coverage is attained by maximizing $\cos(\Sigma_{i \in \{i|p_i \in P_{sel}\}} p_i, q)$.

In one example embodiment, a BERT model 312 is applied to estimate the probability of the passage $p_i$ 320 being supporting evidence to the given question q 316, where a concatenation of q 316 and $p_i$ 320 is input into the BERT model 312, and one or more hidden states of a last layer are used to represent q 316 and $p_i$ 320 in vector space, denoted as q 304 and $p_i$ 308, respectively; wherein a fully connected layer $f(\cdot)$ followed by sigmoid activation is added to an end of the BERT model 312; and a scalar $Prob(p_i|q)$ is output to estimate a relevancy of passage $p_i$ 320 to the given question q 316. In one example embodiment, the BERT model 312 is trained using a supervised training objective function based on a set of labeled training examples 332 where, for each training instance (q, P), $\{p_i\}^+ = \{p_i\}$, $\forall_i \in \{i|p_i \in P^+\}$; $\{p_i\}^- = \{p_i\}$, $\forall_i \in \{i|p_i \in P^-\}$; and $\{p_i\} = \{p_i\}^+ \cup \{p_i\}^-$ are defined.

In one example embodiment, the supervised training objective function comprises a sum of a cross-entropy loss corresponding to a relevance condition that is a measure of a similarity or dissimilarity between a question vector and each passage vector; a weighted cosine-embedding loss for a coverage condition that is a measure of a similarity between the question vector and a subspace spanned by one or more selected passage vectors; and a weighted regularization of a diversity condition that is a measure of an overall distance among supporting passage vectors.

In one example embodiment, the supervised training objective function is defined as:

$$\mathcal{L}(\{p_i\}; q; y) = \mathcal{L}_{sup}(\{p_i\}; q; y) + \alpha \mathcal{L}_c(\{p_i\}; q; y) + \beta \mathcal{L}_d(\{p_i\}^+)$$

where $$\mathcal{L}_{sup}(\{p_i\}; q; y) = -\sum_i y_{p_i} \log(f(p_i)), \quad (1)$$

$$\mathcal{L}_c(\{p_i\}; q; y) = \begin{cases} 1 - \cos(q, \sum_i p_i), \\ \quad \text{if } \prod_{p_i} y_{p_i} = 1 \\ \max(0, \cos(q, \sum_i p_i) - \gamma), \\ \quad \text{if } \prod_{p_i} y_{p_i} = 0 \end{cases} \quad (2)$$

$$\mathcal{L}_d(\{p_i\}^+) = \sum_{p_i, p_j, i \neq j} (1 - \ell_1(p_i, p_j)). \quad (3)$$

where α and β are hyperparameter weights, where γ is a cosine similarity margin, and $\ell_1(\cdot, \cdot)$ denotes an $L_1$ loss between two input vectors.

In one example embodiment, the question q 316 is answered with the computerized machine learning system.

In one aspect, a non-transitory computer readable medium comprises computer executable instructions which when executed by a computer cause the computer to perform the method of obtaining a given question q 316; obtaining a set of N passages from an electronic passage database 384; determining for each passage $p_i$ 320 of the set of N passages, a probability of a corresponding passage $p_i$ 320 being a supportive passage for the given question q 316 (lines 1-3 of algorithm 400); ranking the set of N passages based on the determined probabilities (line 4 of algorithm 400); selecting M passages that are ranked 1 to M of the set of N passages (line 6 of algorithm 400); selecting a set of L passages $P_{sel}$ based on a plurality of scores (lines 7 and 23 of algorithm 400), each score assigned to a set of candidate passages of the set of N passages, each score being based on the determined probabilities, the selected M passages, and a weighted regulation parameter; and providing a set of M highest ranked passages of the set of L passages $P_{sel}$ to a computerized machine learning system to answer the question q 316 based on the set of L passages $P_{sel}$ (line 24 of algorithm 400).

In one aspect, an apparatus comprises a memory; and at least one processor, coupled to said memory, and operative to perform operations comprising obtaining a given question q 316; obtaining a set of N passages from an electronic passage database 384; determining for each passage $p_i$ 320 of the set of N passages, a probability of a corresponding passage $p_i$ 320 being a supportive passage for the given question q 316 (lines 1-3 of algorithm 400); ranking the set of N passages based on the determined probabilities (line 4 of algorithm 400); selecting M passages that are ranked 1 to M of the set of N passages (line 6 of algorithm 400); selecting a set of L passages $P_{sel}$ based on a plurality of scores (lines 7 and 23 of algorithm 400), each score assigned to a set of candidate passages of the set of N passages, each score being based on the determined probabilities, the selected M passages, and a weighted regulation parameter; and providing a set of M highest ranked passages of the set of L passages $P_{sel}$ to a computerized machine learning system to answer the question q 316 based on the set of L passages $P_{sel}$ (line 24 of algorithm 400).

The above operations may be carried out on a same or different processor as the computerized machine learning system.

Figure 6:
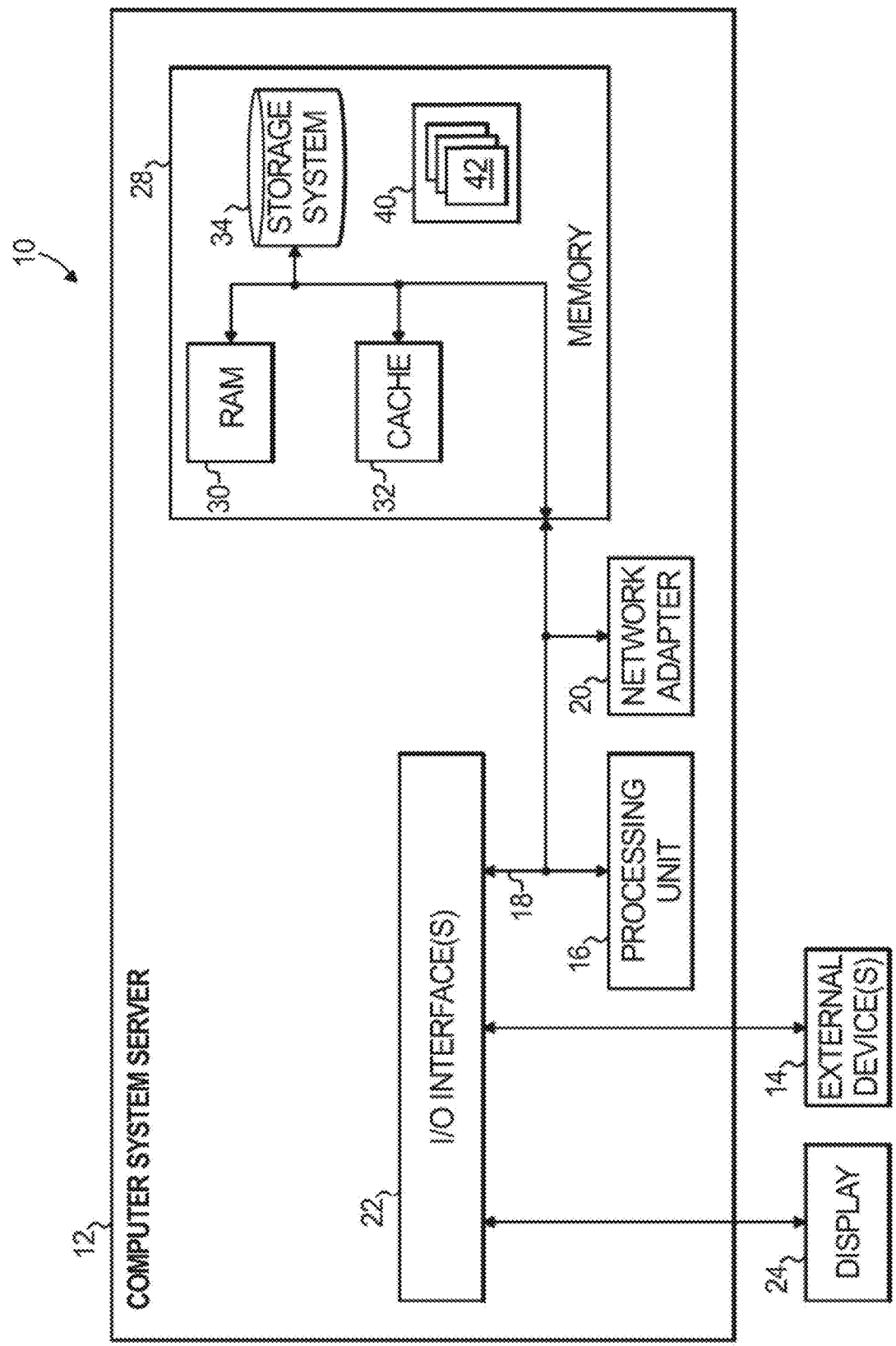
FIG. 6 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

Consider, e.g., a cloud-based service 96 for fine-grained visual recognition in mobile augmented reality, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for natural language inference, the method comprising:

obtaining a given question for input to a hardware processor;

obtaining, using the hardware processor, a set of N passages from an electronic database;

determining, using the hardware processor, for each passage of the set of N passages, a probability of a corresponding passage being a supportive passage for the given question, including applying a BERT model to estimate the probability of the passage $p_i$ being supporting evidence to the given question q, where a concatenation of g and $p_i$ is input into the BERT model, and one or more hidden states of a last layer are used to represent q and $p_i$ in vector space, denoted as q and $p_i$, respectively; wherein a fully connected layer f(•) followed by sigmoid activation is added to an end of the BERT model; and a scalar $Prob(p_i|q)$ is output to estimate a relevancy of passage $p_i$ to the given question q, wherein each passage of the set of N passages is designated as $p_j$ and the given question is designated as q;

beam search ranking, using the hardware processor, the set of N passages based on the determined probabilities and a score function;

selecting, using the hardware processor, M passages that are ranked 1 to M of the set of N passages, where M is a hyperparameter that corresponds to a beam size;

selecting, using the hardware processor, a set of L passages based on a plurality of scores, each score assigned to a set of candidate passages of the set of N passages, each score being based on the determined probabilities, the selected M passages, and a weighted regulation parameter;

providing, using the hardware processor, a set of M highest ranked passages of the set of L passages to a computerized machine learning system to answer the question based on the set of L passages; and answering the question with the computerized machine learning system, wherein the score function for finding a best passage is defined by a summation of:
  a summation of probabilities of a given passage given a specified question;
  a first hyperparameter multiplied by a cosine of a summation of multiplications of an encoded question vector and an encoded passage vector; and
  a second hyperparameter multiplied by a summation of losses between a first encoded passage vector and a second encoded passage vector.

2. The method of claim 1, wherein the set of N passages comprises a mixture set of passages $P=P^+\cup P^-$ with one or more passages $p\in P^+$ being relevant to the given question and one or more passages $p\in P^+$ being irrelevant to the given question, wherein each passage of the set of N passages is designated as $p_i$.

3. The method of claim 1, wherein:
  the selected set of L passages is designated as $P_{sel}$ and is similar to the given question q such that $P_{sel}$ has a probability of $\Sigma_{p_i \hat{A} P_{sel}} Pr(p_i|q)$ that is higher than an average probability for an unselected set of passages, wherein each passage of the set of N passages is designated as $p_i$ and the given question is designated as q;
  $P_{sel}$ covers all facts asked by the given question q such that a joint set of passages in $P_{sel}$ has a high similarity to the given question q and maximizes cos $(\Sigma_{i\in\{i|p_i\in P_{sel}\}}p_i, q)$; and
  $P_{sel}$ covers passages $p_i$ having diversity based on an average distance between any pair of passages $p_i$ in $P_{sel}$.

4. The method of claim 3, wherein the diversity is attained by maximizing $\Sigma_{i,j\in\{i,j|p_i,p_j\in P_{sel},i\neq j\}}1_1(p_i, p_j)$ where $1_1(\bullet,\bullet)$ denotes an $L_1$ distance; and wherein coverage is attained by maximizing $\cos(\Sigma_{i\in\{i|p_i\in P_{sel}\}}p_i,q)$.

5. The method of claim 1, further comprising training the BERT model using a supervised training objective function based on a set of labeled training examples where, for each training instance (q, P), $\{p_i\}^+=\{p_i\}, \forall_i\in\{i|p_i\in P^+\}$; $\{p_i\}^-=\{p_i\}, \forall_i\in\{i|p_i\in P^-\}$; and $\{p_i\}=\{p_i\}^+\cup\{p_i\}^-$ are defined.

6. The method of claim 5, wherein the supervised training objective function comprises a sum of a cross-entropy loss corresponding to a relevance condition that is at least one of a measure of a similarity and a measure of a dissimilarity between a question vector and each passage vector; a weighted cosine-embedding loss for a coverage condition that is a measure of a similarity between the question vector and a subspace spanned by one or more selected passage vectors; and a weighted regularization of a diversity condition that is a measure of an overall distance among supporting passage vectors.

7. The method of claim 6, wherein the supervised training objective function is defined as:

$$\mathcal{L}(\{p_i\}; q; y) = \mathcal{L}_{sup}(\{p_i\}; q; y) + \alpha\mathcal{L}_c(\{p_i\}; q; y) + \beta\mathcal{L}_d(\{p_i\}^+)$$

where $$\mathcal{L}_{sup}(\{p_i\}; q; y) = -\sum_i y_{p_i}\log(f(p_i)), \quad (1)$$

$$\mathcal{L}_c(\{p_i\}; q; y) = \begin{cases} 1-\cos(q, \sum_i p_i), \\ \quad \text{if } \prod_{p_i} y_{p_i} = 1 \\ \max(0, \cos(q, \sum_i p_i) - \gamma), \\ \quad \text{if } \prod_{p_i} y_{p_i} = 0 \end{cases} \quad (2)$$

$$\mathcal{L}_d(\{p_i\}^+) = \sum_{p_i,p_j,i\neq j}(1-\ell_1(p_i, p_j)). \quad (3)$$

where $\alpha$ and $\beta$ are hyperparameter weights, where $\gamma$ is a cosine similarity margin, and $1_1(\bullet,\bullet)$ denotes an $L_1$ loss between two input vectors.

8. A non-transitory computer readable medium comprising computer executable instructions which when executed by a computer cause the computer to perform the method of:
  obtaining a given question q;
  obtaining a set of N passages from an electronic database;
  determining for each passage of the set of N passages, a probability of a corresponding passage being a supportive passage for the given question, including applying a BERT model to estimate the probability of the passage $p_i$ being supporting evidence to the given question q, where a concatenation of q and $p_i$ is input into the BERT model, and one or more hidden states of a last layer are used to represent q and $p_i$ in vector space, denoted as q and $p_i$, respectively; wherein a fully connected layer f($\bullet$) followed by sigmoid activation is added to an end of the BERT model; and a scalar Prob($p_i$|q) is output to estimate a relevancy of passage $p_i$ to the given question q, wherein each passage of the set of N passages is designated as $p_i$ and the given question is designated as q;
  beam search ranking the set of N passages based on the determined probabilities and a score function;
  selecting M passages that are ranked 1 to M of the set of N passages, where M is a hyperparameter that corresponds to a beam size;
  selecting a set of L passages based on a plurality of scores, each score assigned to a set of candidate passages of the set of N passages, each score being based on the determined probabilities, the selected M passages, and a weighted regulation parameter;
  providing a set of M highest ranked passages of the set of L passages to a computerized machine learning system in order to answer the question based on the set of L passages; and
  answering the question with the computerized machine learning system, wherein the score function for finding a best passage is defined by a summation of:
    a summation of probabilities of a given passage given a specified question;
    a first hyperparameter multiplied by a cosine of a summation of multiplications of an encoded question vector and an encoded passage vector; and
    a second hyperparameter multiplied by a summation of losses between a first encoded passage vector and a second encoded passage vector.

9. An apparatus comprising:
a memory; and
at least one processor, coupled to said memory, and operative to perform operations comprising:
obtaining a given question;
obtaining a set of N passages from an electronic database;
determining for each passage of the set of N passages, a probability of a corresponding passage being a supportive passage for the given question, including applying a BERT model to estimate the probability of the passage $p_i$ being supporting evidence to the given question q, where a concatenation of q and $p_i$ is input into the BERT model, and one or more hidden states of a last layer are used to represent q and p; in vector space, denoted as q and $p_i$, respectively; wherein a fully connected layer $f(\bullet)$ followed by sigmoid activation is added to an end of the BERT model; and a scalar $Prob(p_i|g)$ is output to estimate a relevancy of passage $p_i$ to the given question q, wherein each passage of the set of N passages is designated as $p_j$ and the given question is designated as q;
beam search ranking the set of N passages based on the determined probabilities and a score function;
selecting M passages that are ranked 1 to M of the set of N passages, where M is a hyperparameter that corresponds to a beam size;
selecting a set of L passages based on a plurality of scores, each score assigned to a set of candidate passages of the set of N passages, each score being based on the determined probabilities, the selected M passages, and a weighted regulation parameter;
providing a set of M highest ranked passages of the set of L passages to a computerized machine learning system in order to answer the question based on the set of L passages; and
answering the question with the computerized machine learning system, wherein the score function for finding a best passage is defined by a summation of:
a summation of probabilities of a given passage given a specified question;
a first hyperparameter multiplied by a cosine of a summation of multiplications of an encoded question vector and an encoded passage vector; and
a second hyperparameter multiplied by a summation of losses between a first encoded passage vector and a second encoded passage vector.

10. The apparatus of claim 9, wherein the set of N passages comprises a mixture set of passages $P=P^+ \cup P^-$ with one or more passages $p \in P^+$ being relevant to the given question q and one or more passages $p \in P^-$ being irrelevant to the given question q, wherein each passage of the set of N passages is designated as $p_i$ and the given question is designated as q.

11. The apparatus of claim 9, wherein a score function g for finding a best passage is defined by:

$$g(P_{sel}; q; \{p_i\}) = \sum_{p_i} Pr(p_i | q) + \alpha \cos\left(\sum_{p_i} p_i, q\right) + \beta \sum_{p_i, p_j, i \neq j} \ell_1(p_i, p_j)$$

where $\alpha$ and $\beta$ are hyperparameters, each passage of the set of N passages is designated as $p_i$, the given question is designated as q, and $l_1(\bullet,\bullet)$ denotes an $L_1$ loss between two input vectors.

12. The apparatus of claim 9, wherein:
the selected set of L passages is designated as $P_{sel}$ and is similar to the given question q such that $P_{sel}$ has a probability of $\Sigma_{p_i \in P_{sel}} Pr(p_i|q)$ that is higher than an average probability for an unselected set of passages, wherein each passage of the set of N passages is designated as $p_i$ and the given question is designated as q;
$P_{sel}$ covers all facts asked by the given question q such that a joint set of passages in $P_{sel}$ has a high similarity to the given question q and maximizes cos $(\Sigma_{i \in \{i|p_i \in P_{sel}\}} p_i, q)$; and
$P_{sel}$ covers passages $p_i$ having diversity based on an average distance between any pair of passages $p_i$ in $P_{sel}$.

13. The apparatus of claim 12, wherein the diversity is attained by maximizing $\Sigma_{i,j \in \{i,j|p_i,p_j \in P_{sel}, i \neq j\}} l_1(p_i, p_j)$ where $l_1(\bullet,\bullet)$ denotes an $L_1$ distance; and wherein coverage is attained by maximizing $\cos(\Sigma_{i \in \{i|p_i \in P_{sel}\}} p_i, q)$.

14. The apparatus of claim 9, the operations further comprising training the BERT model using a supervised training objective function based on a set of labeled training examples where, for each training instance (q, P), $\{p_i\}^+= \{p_i\}$, $\forall_i \in \{i|p_i \in P^+\}$; $\{p_i\}^-=\{p_i\}$, $\forall_i \in \{i|p_i \in P^-\}$; and $\{p_i\}=\{p_i\}^+ \cup \{p_i\}^-$ are defined.

15. The apparatus of claim 14, wherein the supervised training objective function comprises a sum of a cross-entropy loss corresponding to a relevance condition that is a measure of a similarity or dissimilarity between a question vector and each passage vector; a weighted cosine-embedding loss for a coverage condition that is a measure of a similarity between the question vector and a subspace spanned by one or more selected passage vectors; and a weighted regularization of a diversity condition that is a measure of an overall distance among supporting passage vectors.

16. The apparatus of claim 15, wherein the supervised training objective function is defined as:

$$\mathcal{L}(\{p_i\}; q; y) = \mathcal{L}_{sup}(\{p_i\}; q; y) + \alpha \mathcal{L}_c(\{p_i\}; q; y) + \beta \mathcal{L}_d(\{p_i\}^+)$$

where $$\mathcal{L}_{sup}(\{p_i\}; q; y) = -\sum_i y_{p_i} \log(f(p_i)), \tag{1}$$

$$\mathcal{L}_c(\{p_i\}; q; y) = \begin{cases} 1 - \cos(q, \sum_i p_i), & \text{if } \prod_{p_i} y_{p_i} = 1 \\ \max(0, \cos(q, \sum_i p_i) - \gamma), & \text{if } \prod_{p_i} y_{p_i} = 0 \end{cases} \tag{2}$$

$$\mathcal{L}_d(\{p_i\}^+) = \sum_{p_i, p_j, i \neq j} (1 - \ell_1(p_i, p_j)). \tag{3}$$

where $\alpha$ and $\beta$ are hyperparameter weights, where $\gamma$ is a cosine similarity margin, and $l_1(\bullet,\bullet)$ denotes an $L_1$ loss between two input vectors.

* * * * *